United States Patent
Matsubara et al.

(10) Patent No.: US 6,941,207 B2
(45) Date of Patent: Sep. 6, 2005

(54) STEERING ANGULAR VELOCITY DETECTING DEVICE

(75) Inventors: Katsunori Matsubara, Toyonaka (JP); Makoto Inoue, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/959,940

(22) Filed: Oct. 6, 2004

(65) Prior Publication Data

US 2005/0080531 A1 Apr. 14, 2005

(30) Foreign Application Priority Data

Oct. 10, 2003 (JP) ........................................ 2003-351997

(51) Int. Cl.$^7$ ............................ B62D 15/02; B62D 5/00; G06F 7/00
(52) U.S. Cl. ......................... 701/41; 180/443; 180/408; 180/442; 180/444; 180/168; 180/415; 341/15; 324/207.11; 324/207.23
(58) Field of Search ............................. 701/49, 93, 41; 180/443, 167–168; 318/727; 324/207.11, 20; 341/15; 73/862.324; B62D 6/00, 5/04, 5/07, 5/06

(56) References Cited

U.S. PATENT DOCUMENTS

| | | | | | |
|---|---|---|---|---|---|
| 3,440,617 | A | * | 4/1969 | Lesti ........................... | 382/224 |
| 3,715,572 | A | * | 2/1973 | Bennett ....................... | 701/300 |
| 3,940,767 | A | * | 2/1976 | DeLano et al. ............... | 342/63 |
| 4,322,670 | A | * | 3/1982 | Taylor ......................... | 318/587 |
| 4,513,835 | A | * | 4/1985 | Fukino et al. ............... | 180/422 |
| 4,549,627 | A | * | 10/1985 | Takeshima et al. .......... | 180/422 |
| 4,552,240 | A | * | 11/1985 | Takeshima et al. .......... | 180/422 |
| 4,576,061 | A | * | 3/1986 | Yamakawa et al. .......... | 180/233 |
| 4,633,709 | A | * | 1/1987 | Numata et al. ............ | 73/178 R |
| 4,753,308 | A | * | 6/1988 | Noto et al. .................. | 180/446 |

(Continued)

FOREIGN PATENT DOCUMENTS

| | | | | | |
|---|---|---|---|---|---|
| DE | 3545543 | A | * | 7/1987 | ............ B60K/9/00 |
| EP | 45013 | A | * | 2/1982 | ............ B01D/53/34 |
| EP | 190678 | A | * | 8/1986 | ............ B62D/5/04 |
| EP | 397324 | A | * | 11/1990 | ............ B62D/6/02 |
| EP | 972695 | A2 | * | 1/2000 | ............ B62D/5/065 |
| EP | 978441 | A2 | * | 2/2000 | ............ B62D/15/02 |
| EP | 1492693 | A1 | * | 1/2005 | ............ B62D/6/00 |
| GB | 2146727 | B | * | 10/1986 | ............ B60K/17/34 |
| JP | 06255511 | A | * | 9/1994 | ............ B62D/6/00 |
| JP | 10007010 | A | * | 1/1998 | ............ B62D/6/00 |
| JP | 2000053011 | A | * | 2/2000 | ............ B62D/6/00 |
| JP | 2000-85609 | | | 3/2000 | |
| JP | 2000085609 | A | * | 3/2000 | ............ B62D/6/00 |
| JP | 2001247048 | A | * | 9/2001 | ............ B62D/6/00 |
| JP | 2002193120 | A | * | 7/2002 | ............ B62D/5/04 |
| JP | 2004017898 | A | * | 1/2004 | ............ B62D/6/00 |
| JP | 2004090834 | A | * | 3/2004 | ............ B62D/6/00 |
| JP | 2004203112 | A | * | 7/2004 | ............ B62D/6/00 |
| JP | 2004203113 | A | * | 7/2004 | ............ B62D/6/00 |

OTHER PUBLICATIONS

DERWENT–ACC–No: 2003–833674, pub. date: Jan. 5, 2005, Electric power assisted steering system, has torque sensor for indicating torque carried by portion of steering mechanism and dampening component is dependent on signal from difference unit.*

(Continued)

*Primary Examiner*—Cuong Nguyen
(74) *Attorney, Agent, or Firm*—RatnerPrestia

(57) ABSTRACT

Operates steering angular velocity in first steering angular velocity calculating unit and second steering angular velocity calculating unit, by using steering angle signal from steering angle generating unit, and outputs steering angular velocity by switching them with reference to a certain threshold value of steering angular velocity.

6 Claims, 5 Drawing Sheets

U.S. PATENT DOCUMENTS

| | | | | |
|---|---|---|---|---|
| 4,763,262 A | * | 8/1988 | Leiber | 701/90 |
| 4,770,265 A | * | 9/1988 | Allen | 180/415 |
| 4,834,205 A | * | 5/1989 | Mizuno et al. | 180/422 |
| 4,840,246 A | * | 6/1989 | Yamakawa et al. | 180/247 |
| 4,970,647 A | * | 11/1990 | Karadsheh et al. | 701/43 |
| 5,040,629 A | * | 8/1991 | Matsuoka et al. | 180/446 |
| 5,076,381 A | * | 12/1991 | Daido et al. | 180/446 |
| 5,212,641 A | * | 5/1993 | Iwata et al. | 701/41 |
| 5,434,784 A | * | 7/1995 | Bradley et al. | 701/41 |
| 5,508,919 A | * | 4/1996 | Suzuki et al. | 701/41 |
| 5,528,497 A | * | 6/1996 | Yamamoto et al. | 701/41 |
| 5,586,028 A | * | 12/1996 | Sekine et al. | 701/1 |
| 5,703,775 A | * | 12/1997 | Yamamoto et al. | 701/41 |
| 5,704,446 A | * | 1/1998 | Chandy et al. | 180/446 |
| 5,719,766 A | * | 2/1998 | Bolourchi et al. | 701/42 |
| 5,774,819 A | * | 6/1998 | Yamamoto et al. | 701/41 |
| 5,828,973 A | * | 10/1998 | Takeuchi et al. | 701/41 |
| 5,893,896 A | * | 4/1999 | Imamura et al. | 701/70 |
| 5,978,731 A | * | 11/1999 | Matsuda | 701/208 |
| 6,062,332 A | * | 5/2000 | Stephenson et al. | 180/305 |
| 6,064,166 A | * | 5/2000 | Kaji | 318/489 |
| 6,120,113 A | * | 9/2000 | Yamazaki et al. | 303/116.2 |
| 6,163,746 A | * | 12/2000 | Moerbe | 701/41 |
| 6,198,988 B1 | * | 3/2001 | Tseng | 701/1 |
| 6,374,167 B2 | * | 4/2002 | Iwazaki | 701/41 |
| 6,381,528 B1 | * | 4/2002 | Kawada et al. | 701/41 |
| 6,408,235 B1 | * | 6/2002 | Tanke et al. | 701/41 |
| 6,418,790 B1 | * | 7/2002 | Yukawa et al. | 73/504.12 |
| 6,494,281 B1 | * | 12/2002 | Faye et al. | 180/197 |
| 6,523,410 B2 | * | 2/2003 | Matsubara et al. | 73/504.16 |
| 6,552,533 B2 | * | 4/2003 | Schodlbauer et al. | 324/207.22 |
| 6,567,737 B2 | * | 5/2003 | Nakamura et al. | 701/96 |
| 6,580,988 B2 | * | 6/2003 | Lin et al. | 701/41 |
| 6,598,476 B2 | * | 7/2003 | Terada et al. | 73/504.16 |
| 6,637,544 B2 | * | 10/2003 | Stevens et al. | 180/446 |
| 6,640,171 B2 | * | 10/2003 | Chen et al. | 701/41 |
| 6,654,674 B2 | * | 11/2003 | Lu et al. | 701/36 |
| 6,678,595 B2 | * | 1/2004 | Zheng et al. | 701/41 |
| 6,681,882 B2 | * | 1/2004 | Zheng et al. | 180/402 |
| 6,688,420 B2 | * | 2/2004 | Zheng et al. | 180/402 |
| 6,721,639 B2 | * | 4/2004 | Raypole | 701/34 |
| 6,729,434 B2 | * | 5/2004 | Stevens et al. | 180/446 |
| 6,736,234 B2 | * | 5/2004 | Zheng et al. | 180/402 |
| 2001/0005121 A1 | * | 6/2001 | Sakamaki | |
| 2003/0088350 A1 | * | 5/2003 | Lin et al. | |
| 2003/0100979 A1 | * | 5/2003 | Lu et al. | 701/36 |
| 2003/0120406 A1 | * | 6/2003 | Raypole et al. | 701/43 |
| 2003/0187558 A1 | * | 10/2003 | Zheng et al. | 701/41 |
| 2003/0196847 A1 | * | 10/2003 | Zheng et al. | 180/402 |
| 2003/0196848 A1 | * | 10/2003 | Zheng et al. | 180/402 |
| 2004/0088093 A1 | * | 5/2004 | Yao et al. | |
| 2004/0100251 A1 | * | 5/2004 | Lohberg | 324/166 |
| 2004/0193374 A1 | * | 9/2004 | Hac et al. | 701/301 |
| 2004/0199300 A1 | * | 10/2004 | Gustafsson et al. | |
| 2005/0080531 A1 | * | 4/2005 | Matsubara et al. | 701/41 |

OTHER PUBLICATIONS

Burton, et al., DERWENT–ACC–No: 2002–364197, May 4, 2004, Electric power–assisted steering system for vehicle, has signal processor that produces torque demand signal with damping component depending on torque, angular velocity of steering mechanism.*

Goings et al., DERWENT–ACC–No: 1990–343289, Nov. 14, 1990, Rear wheel steering angle control method—determining condition where measured vehicle speed value was previously evaluated to be not credible and is now evaluated to be credible.*

DERWENT–ACC–No: 1986–213456, published date: Aug. 13, 1986, Electronmotive power–assisted steering system—measures driver–applied steering torque, speed, and angle to determine optimum force applied by motor gear.*

* cited by examiner

STEERING ANGULAR VELOCITY DETECTING DEVICE

FIELD OF THE INVENTION

The present invention concerns a steering angular velocity detecting device used for vehicle control system of automobile, etc.

BACKGROUND OF THE INVENTION

Conventionally, two different methods are known as method for detecting a steering angular velocity. The first method consists in counting the number of pulses generated according to changes in steering angle during a predetermined time period, and determining the steering angular velocity from the results of that counting. The second method consists in counting the cycle of said pulses as well as the high-level or low-level period of the pulses, and determining the steering angular velocity from the time counted.

Known as documentary information of background art relating to conventional art is the Japanese Laid-Open Patent Application No. 2000-85609.

However, the first method has a problem that the detected steering angular velocity is not good accuracy in low speed. And a problem with the second method is that the detected steering angular velocity is not good accuracy in high speed.

SUMMARY OF THE INVENTION

The present invention has been realized in view of the above-mentioned problems.

The steering angular velocity detecting device according to the present invention comprises:

(i) a steering angle generating unit for generating a steering angle signal in the shape of stairs depending on changes in steering angle, (ii) a first steering angular velocity calculating unit for determining the first steering angular velocity by dividing a first changed amount of the steering angle signal during a predetermined time by the predetermined time, (iii) a second steering angular velocity calculating unit for determining (a) a second changed amount of the steering angle signal at the point in time of a change of the steering angle signal, (b) a difference time by subtracting time at a previous change of the steering angle signal from time at the change of the steering angle signal, and (c) a second steering angular velocity dividing the second changed amount by the difference time, and (iv) a selector for selecting and outputting the first steering angular velocity and the second steering angular velocity. And, the selector selects the first steering angular velocity, in the case where the first steering angular velocity and/or the second steering angular velocity are larger than a predetermined threshold value.

DETAILED DESCRIPTION OF THE EXEMPLARY EMBODIMENTS

Explanation will be made below on the preferred embodiment of the present invention, with reference to drawings.

Figure 1:
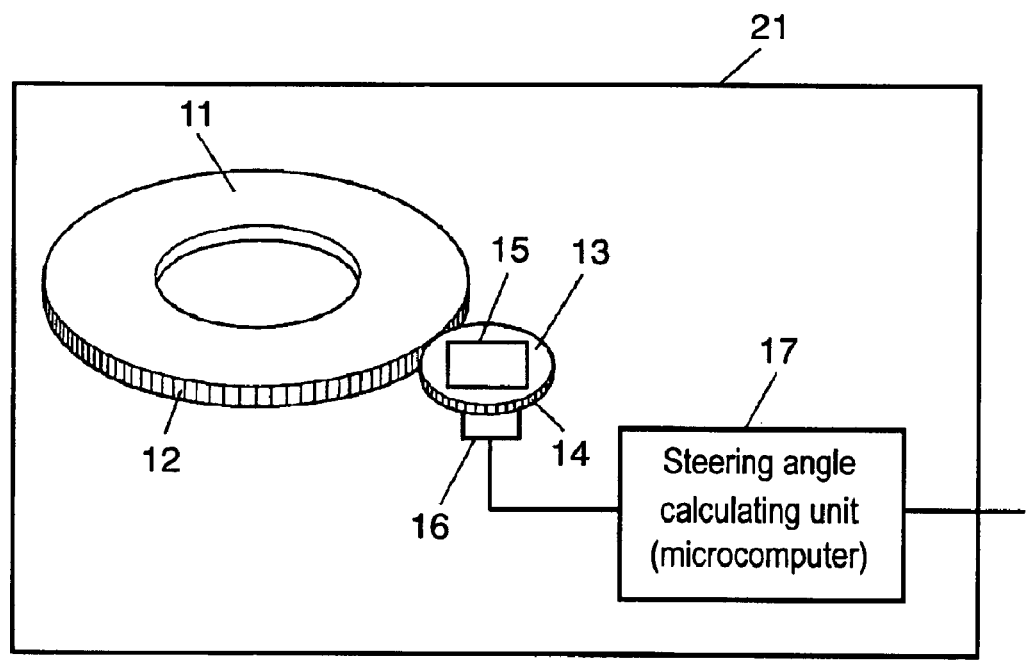
FIG. 1 is a block diagram of the steering angle generating unit in the preferred embodiment of the present invention.

FIG. 1 indicates a block diagram of the steering angle generating unit in the preferred embodiment of the present invention. On the outer circumference of first rotor 11 are formed teeth 12, and the number of these teeth is m (m is a natural number), while on the outer circumference of second rotor 13 are formed teeth 14, and the number of these teeth is n (n is a natural number, satisfying the relation n<m). First rotor 11 and second rotor 13 are connected to each other by means of teeth 12 and teeth 14. As first rotor 11 turns, second rotor 13 turns at a speed m/n times higher than the speed of first rotor 11.

On second rotor 13 is integrally formed magnet 15, as shown in the drawing. Magnet 15 is magnetized evenly at 2$p$ (p is a natural number) magnetic poles. To detect the magnetic flux of magnet 15, magneto-resistive element 16 which is a sensor is disposed facing magnet 15 with a clearance. By being constructed this way, magneto-resistive element 16 outputs a sinusoidal signal of p cycles per rotation of second rotor 13. In the present preferred embodiment, an anisotropic magneto-resistive element (AMR element) is used for magneto-resistive element 16.

Steering angle calculating unit (microcomputer) 17 samples sinusoidal signal output from magneto-resistive element 16 and converts it into digital data, determines steering angle by calculating that digital data, and outputs it as steering angle signal 25. For the convenience of explanation, the sampling cycle will be given as T1. In the present preferred embodiment, steering angle calculating unit 17 determines steering angle at each time of sampling, and outputs steering angle signal 25, but it is also all right to determine the steering angle and makes an output once in several times of sampling. Steering angle signal 25 is output at first steering angular velocity calculating unit 22 and second steering angular velocity calculating unit 23. Moreover, steering angle calculating unit 17 detects deceleration of second rotor 13, from a change in steering angle signal 25, and outputs a signal indicating deceleration to selector 24.

Next, explanation will be made on how to determine the steering angular velocity.

Figure 2:
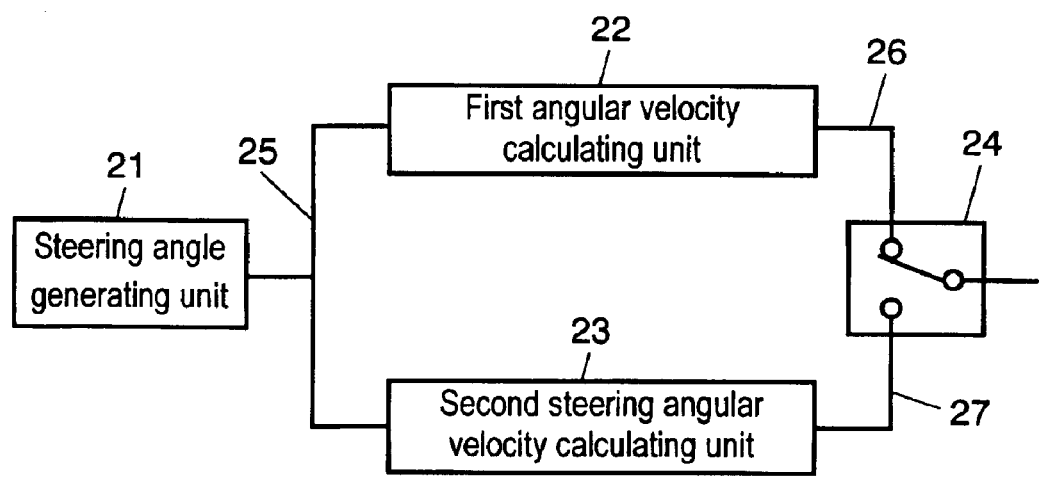
FIG. 2 is a block diagram of the steering angular velocity detecting device in the preferred embodiment of the present invention.

As shown in FIG. 2, the steering angular velocity detecting device in the preferred embodiment of the present invention comprises:

(i) steering angle generating unit 21 described in FIG. 1, (ii) first steering angular velocity calculating unit 22 for determining first steering angular velocity 26 from steering angle signal 25 output from steering angle generating unit 21, (iii) second steering angular velocity calculating unit 23 for determining second steering angular velocity 27 from steering angle signal 25 output from steering angle generating unit 21, and (iv) selector 24 for selecting first steering angular velocity 26 and second steering angular velocity 27. Steering angle calculating unit 17, first steering angular velocity calculating unit 22, second steering angular velocity calculating unit 23, and selector 24 may be realized with a single microcomputer.

First steering angular velocity calculating unit 22 determines, each time when new steering angle signal 25 is input, the difference between newly input steering angle signal 25 and steering angle signal 25 input predetermined time T2 earlier, and divides that difference by time T2, to determine first steering angular velocity 26. Time T2 is equal to k times period T1. Natural number "k" may be 1 but shall preferably be no less than 2.

Second steering angular velocity calculating unit 23 determines, each time when there is any change in steering angle signal 25, (i) the difference in steering angle by subtracting steering angle signal 25 before the change from steering angle signal 25 after the change, (ii) time T4 passed from the immediately previous change to the change this time, and (iii) second steering angular velocity 27 by dividing the difference in steering angle between the two by time T4. Second steering angular velocity calculating unit 23 latches the determined second steering angular velocity 27 during T4.

Selector 24 selectively outputs first steering angular velocity 26 and second steering angular velocity 27, with reference to a certain threshold value of steering angular velocity. By constructing a steering angular velocity detecting device as described above, it becomes possible to determine steering angular velocity better matching the actual steering angular velocity with high accuracy.

Figure 3:
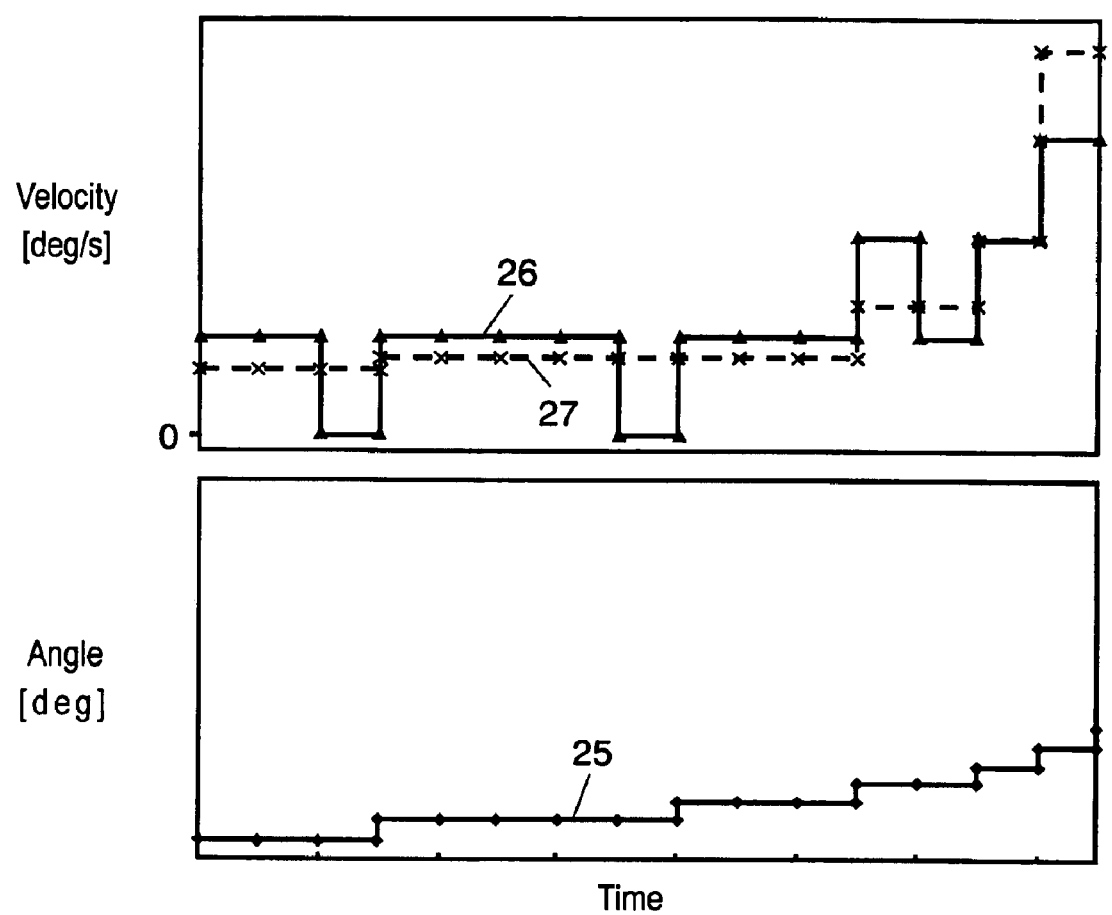
FIG. 3 is a drawing showing the steering angular velocity determined by the first and second steering angular velocity calculating units, during a low speed traveling, in the preferred embodiment of the present invention.

FIG. 3 is a chart showing the steering angular velocity determined with respective steering angular velocity calculating units 22, 23, during a low-speed traveling.

FIG. 3 shows that, during a low-speed traveling, second steering angular velocity 27 is capable of following the actual steering angular velocity, to output steering angular velocity, more accurately with less fluctuations compared with first steering angular velocity 26.

Figure 4:
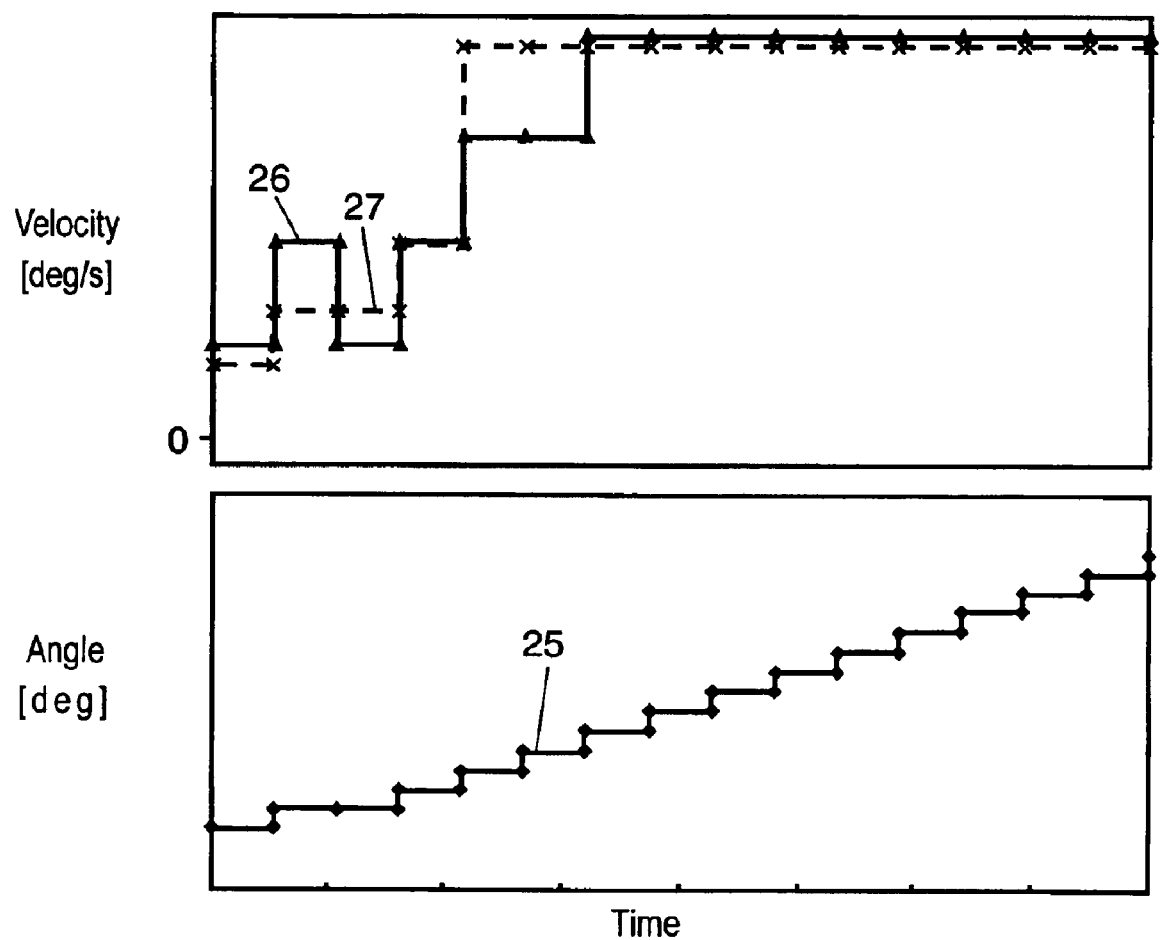
FIG. 4 is a drawing showing the steering angular velocity determined by the first and second steering angular velocity calculating units, during a high speed traveling, in the preferred embodiment of the present invention.

On the other hand, FIG. 4 is a chart showing the steering angular velocity determined with respective steering angular velocity calculating units 22, 23, during a high speed traveling. FIG. 4 shows that, during a high speed traveling, first steering angular velocity 26 is capable of following the actual steering angular velocity, to output steering angular velocity, more accurately with less fluctuations compared with second steering angular velocity 27.

Selector 24 selects and outputs first steering angular velocity 26, in the case where first steering angular velocity 26 and/or second steering angular velocity 27 exceeded predetermined threshold value 28.

Next, threshold value 28 will be explained with reference to FIG. 5.

Figure 5:
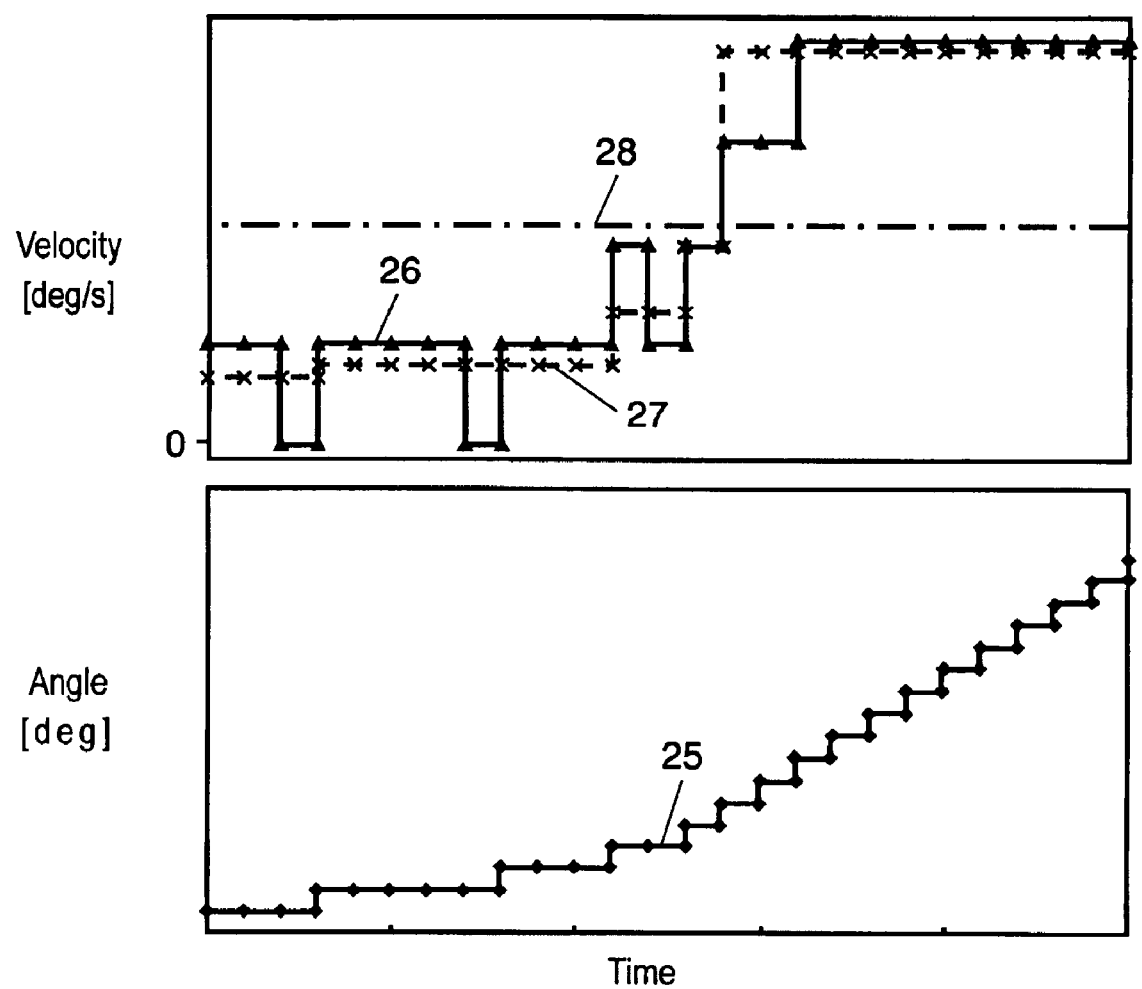
FIG. 5 is a drawing explaining the threshold value in the preferred embodiment of the present invention.

As shown in FIG. 5, threshold value 28 is set in advance for a value at which, in an area slower than threshold value 28, the amount of change of first steering angular velocity 26 becomes larger than the amount of change of second steering angular velocity 27. Namely, with threshold value 28 as border line, the relative amounts of change of first steering angular velocity 26 and change of second steering angular velocity 27 are reversed. By setting threshold value 28 this way, it becomes possible to obtain a highly accurate steering angular velocity.

Next, explanation will be made on the way of determination of steering angular velocity during a low-speed deceleration.

Figure 6:
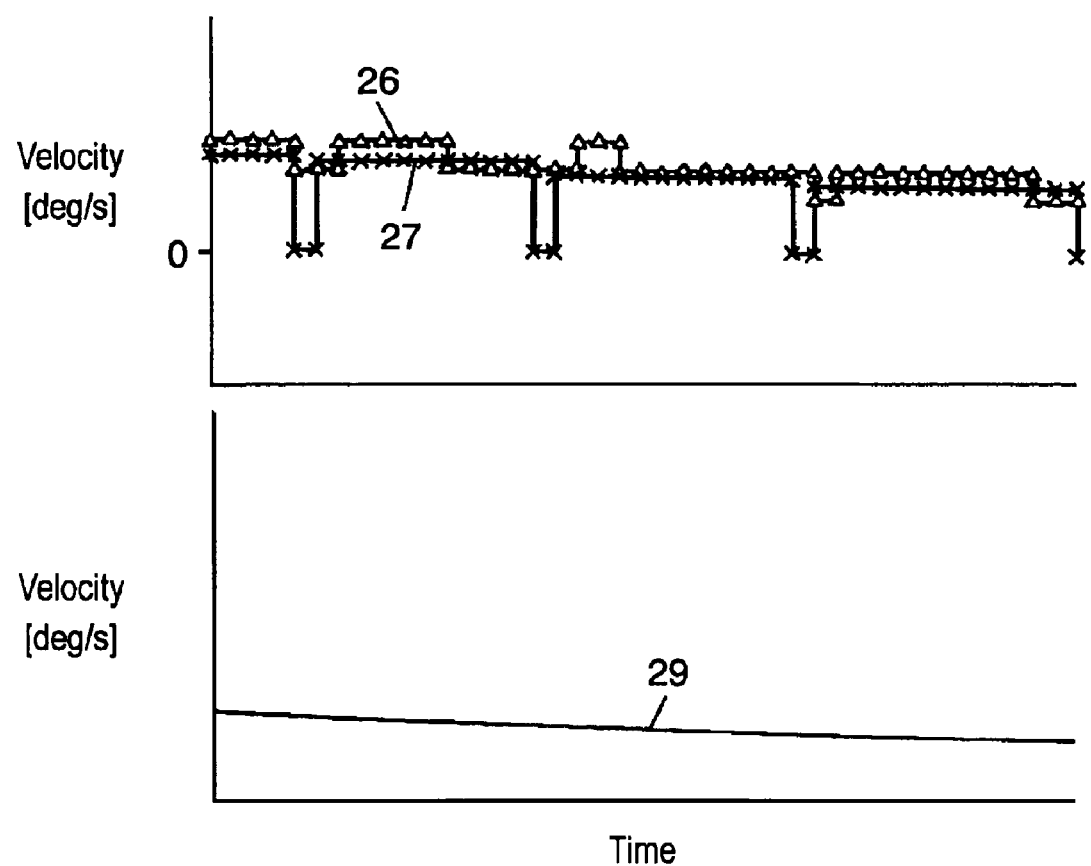
FIG. 6 is a drawing showing the steering angular velocity determined by the first and second steering angular velocity calculating units, during a low-speed deceleration, in the preferred embodiment of the present invention.

FIG. 6 is a drawing showing the steering angular velocity determined by respective steering angular velocity calculating units, during a low-speed deceleration of the steering angular velocity detecting device.

As shown in FIG. 6, in the case where actual steering angular velocity 29 is decelerating at a speed slower than threshold value 28, a portion is produced where second steering angular velocity 27 comes to 0 [deg/s]. To avoid it, in the case where steering angle calculating unit 17 detects deceleration and second steering angular velocity 27 issues 0 [deg/s], selector 24 selects first steering angular velocity 26, and outputs first steering angular velocity 26.

The steering angular velocity detecting device according to the present invention is designed to calculate steering angular velocity by using a first steering angle calculating unit and a second steering angular velocity calculating unit, and outputs them by switching to each other with a certain threshold value as reference value. Therefore, the present invention can provide a steering angular velocity detecting device capable of determining steering angular velocity with high accuracy with improved resolution in the low speed to high speed revolution area. It is useful especially for automobiles, etc. requiring an output of steering angular velocity.

What is claimed is:

1. A steering angular velocity detecting device for vehicle control comprising
    a steering angle generating unit for generating a steering angle signal in the shape of stairs depending on changes in steering angle;
    a first steering angular velocity calculating unit for determining the first steering angular velocity by dividing a first changed amount of the steering angle signal during a predetermined time by the predetermined time;
    a second steering angular velocity calculating unit for determining:
    a) a second changed amount of the steering angle signal at the point in time of a change of the steering angle signal:
    b) a difference time by subtracting time at a previous change of the steering angle signal from time at the change of the steering angle signal, and
    c) a second steering angular velocity by dividing the second changed amount by the difference time; and
    a selector for selecting the first steering angular velocity and the second steering angular velocity,
    wherein, the selector selects the first steering angular velocity, in the case where the first steering angular velocity and/or the second steering angular velocity are larger than a predetermined threshold value.

2. A steering angular velocity detecting device as defined in claim 1, wherein the threshold value is set for a value at which, with the threshold value as border line, the relative amounts of change of the first steering angular velocity and change of the second steering angular velocity are reversed.

3. A steering angular velocity detecting device as defined in claim 1, wherein the selector outputs the first steering angular velocity, in the case where the steering angular velocity is decelerating.

4. A steering angular velocity detecting device as defined in claim 1, wherein the selector outputs the first steering angular velocity, in the case where the steering angular velocity is decelerating and the second steering angular velocity is substantially equal to zero.

5. A steering angular velocity detecting device as defined in claim 1, wherein the steering angle generating unit comprises a magnetic steering angle sensor.

6. A steering angular velocity detecting device as defined in claim 5, wherein the steering angle generating unit further comprises a second rotor which turns in linkage with a first rotor, and the steering angle sensor is provided with a magnet disposed at the central part of the second rotor and an anisotropic magnetic resistance (AMR) element disposed at a position opposing the magnet.

* * * * *